United States Patent [19]

Sakuma

[11] 4,132,647

[45] Jan. 2, 1979

[54] FILTER PLATE OPENING MECHANISM FOR FILTER PRESSES

[75] Inventor: Hiroshi Sakuma, Nagoya, Japan

[73] Assignee: NGK Insulators Ltd., Japan

[21] Appl. No.: 834,133

[22] Filed: Sep. 16, 1977

[30] Foreign Application Priority Data

Jul. 14, 1977 [JP] Japan ............................... 52-83519

[51] Int. Cl.$^2$ ............................................. B01D 35/00
[52] U.S. Cl. ................................................... 210/230
[58] Field of Search ................................. 210/224, 230

[56] References Cited

U.S. PATENT DOCUMENTS

| | | | |
|---|---|---|---|
| 3,232,435 | 2/1966 | Fismer | 210/230 |
| 3,251,472 | 5/1966 | Kurita | 210/230 |
| 3,270,887 | 9/1966 | Juholz et al. | 210/230 X |
| 3,306,455 | 2/1967 | Fismer | 210/230 |
| 3,360,130 | 12/1967 | Kaga | 210/230 X |
| 3,563,386 | 2/1971 | Kurita | 210/230 |
| 3,598,240 | 8/1971 | Abe | 210/230 |
| 3,878,102 | 4/1975 | Busse et al. | 210/230 |

FOREIGN PATENT DOCUMENTS

| | | | |
|---|---|---|---|
| 43-20539 | 9/1968 | Japan | 210/230 |
| 46-25207 | 7/1971 | Japan | 210/230 |

*Primary Examiner*—Theodore A. Granger

*Attorney, Agent, or Firm*—Stevens, Davis, Miller & Mosher

[57] ABSTRACT

A filter plate opening mechanism for successively opening a plurality of filter plates of a filter press comprises filter plate pulling latches arranged on every other filter plates, pivotal pendulums arranged on remaining every other filter plates, space holding chains connecting all the adjacent filter plates and a pair of carriage reciprocally movable in plate opening and reverse directions having a pair of ratchets capable of depressing and restoring to their extended positions. When the carriages move in the opening direction along the both sides of filter plates, one of the ratchets causes one of the filter plates to open and its movement causes the other filter plates to open with the aid of the space holding chains. When the carriages move in the reverse direction, the pair of ratchets are depressed and the pivotal pendulums are upwardly pivotally moved thereby enabling the carriage to pass by separated or opened filter plates, and when the carriage encounters closed or unopened filter plates, the pivotal pendulum restrained by an adjacent filter plate abuts against one of the ratchets of the carriage to stop it which thereafter moves in the opening direction. By repeating the operations all the filter plates of the filter press are opened.

4 Claims, 4 Drawing Figures

4,132,647

FILTER PLATE OPENING MECHANISM FOR FILTER PRESSES

BACKGROUND OF THE INVENTION (1) Field of the Invention:

The present invention relates to a filter plate opening mechanism for successively opening a plurality of filter plates at substantially equal intervals for filter presses.

(2) Description of the Prior Art:

Heretofore, various kinds of filter plate shifters or filter plate opening mechanisms have been suggested. For example, each two adjacent filter plates of a filter press are connected to each other by means of a chain 2 of a determined length, as illustrated in FIG. 1, so that after completion of dewatering or squeeze of slurry, movement of one of the plates in an opening direction by means of a moving ratchet causes to move the other of the plates connected by the chain to the one of the plates until the moving ratchet is stopped by an abutment thereof against a movable head or a filter plate to the side of the movable head side. At the moment the moving stops, an overload detecting device provided in a driving device stops a motor for driving the moving ratchet. Under the opened condition, the filter cakes are discharged or removed from the opened filter chambers. Then the moving ratchet is driven in the reverse direction until it is stopped by its abutment against a filter plate to the side of a front head frame. By repeating these operations the plurality of the filter plates are partially opened in succession.

Such a shifter or filter plate opening mechanism is substantially effective for filter presses having only a small number of filter plates. With filter plates having an large number of filter plates, however, opening distances between the adjacent filter plates are markedly different at the initial and last stages of the opening owing to the elastic restoration of packing materials or filter cloths of the already opened filter plates. Such a variation in opening distance of the filter plates may obstruct the discharge of filter cakes by vibrating filter cloths by means of rotating vibrating devices and the filter cloth washing operation by insertion of a washing device between the filter cloths.

To overcome this problem, it has also been suggested to connect all the filter plates by chains of a constant length and to pull every other filter plates in an opening direction by means of a moving ratchet, such that the other filter plate than filter plate in intermediate positions is slightly shifted or opened to an excess extent in consideration of the elastic restoration of the packing materials and filter cloths. In this case, when the moving ratchet moves in the reverse direction in the preparation for opening the next filter plates, the movement of the ratchet causes to return in the reverse direction the tail end filter plate, which is slightly opened, until the tail end filter plate strikes a closed or unopened filter plate because the moving ratchet never stops until it strikes the closed filter plate. Accordingly, the other filter plates which have already been opened are also returned by the chains to obstruct the discharge of filter cakes and particularly the filter cloth washing by the insertion of cleaning nozzles between the filter plates.

SUMMARY OF THE INVENTION

A primary object of the invention is, therefore, to provide a novel filter plate opening mechanism for filter plates which eliminates the disadvantages of the hitherto used filter plate shifters or opening mechanisms.

A further object of the invention is to provide an improved filter plate opening mechanism for filter presses, which is simple in construction and capable of partially shifting or opening a plurality of filter plates at a determined interval and preventing once opened filter plates from being returned unintentionally by the reverse movement of a moving ratchet.

The filter plate opening mechanism for successively opening partial filter plates of a filter press according to the present invention comprises filter plate pulling latches arranged on side surfaces of every other filter plates, pivotal pendulums arranged on side surfaces of remaining every other filter plates, space holding means substantially the same in size connecting all the adjacent filter plates vertically supported on a filter plate support frame, and carriges arranged on both rails, one by one, parallel to said filter plate support frame provided on both sides of said filter plates, said carriage being driven by a chain whose ends are connected to said carriage to form an endless linkage therewith and having a pair of ratchets in opposition to each other capable of depressing and restoring with the aid of springs, whereby when said carriage moves in a filter plate opening direction, one of said pair of ratchets engages the filter plate pulling latch of one of the filter plates to shift the filter plate in the opening direction and the movement of the filter plate causes to shift successively in the same direction the filter plates connected thereto by said space holding means, and when said carriage moves through separated filter plates in a direction opposite to said opening direction, said pair of ratchets are depressed by their abutments against said filter plate pulling latch and said pivotal pendulums are upwardly pivotally moved by abutments of said pair of ratchets thereagainst, thereby enabling said carriage to pass by the separated filter plates in the direction opposite to said opening direction and when said carriage approaches the close filter plates in the direction opposite to said opening direction, the other of said pair of ratchets engages the pivotal pendulum restrained by the adjacent filter plate pulling latch resulting into a stoppage of said carriage which thereafter moves in the opening direction.

BRIEF DESCRIPTION OF THE DRAWING

These and other objects and advantages of the invention may be readily ascertained by referring to the following description and appended drawings in which.

DETAILED DESCRIPTION OF THE PREFERRED EMBODIMENT

Figure 1:
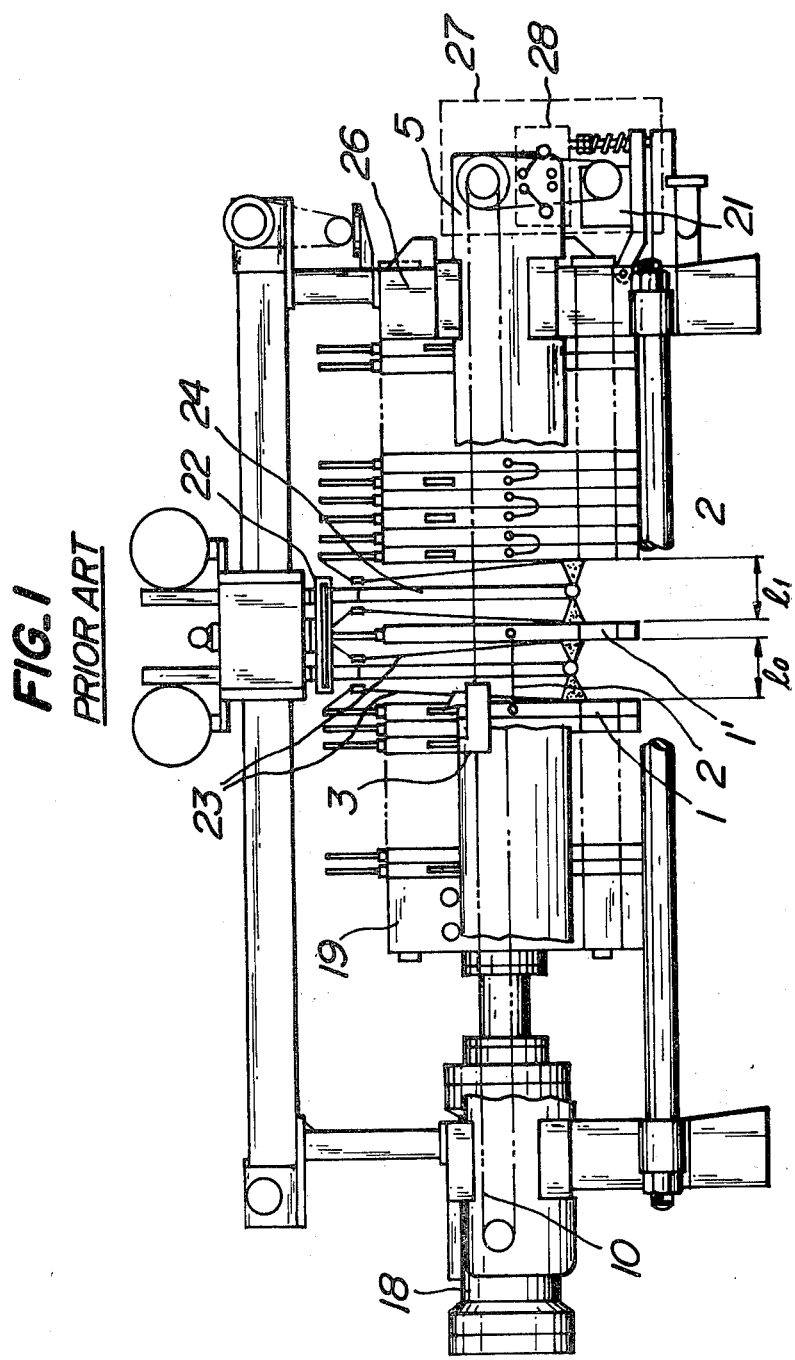
FIG. 1 is an explanatory diagrammatical front elevation of a filter press employing a filter plate shifter in the prior art.

FIG. 1 illustrates an example of a plate shifter or plate opening mechanism of prior art for a filter press having a number of suspended or vertically supported filter plates for successively opening some of them to discharge filter cakes after completion of dewatering or squeeze. As shown in the drawing, each two adjacent filter plates 1 and 1' are connected to each other by means of a chain 2 of a determined length, so that a movement of one 1 of the plates in an opening direction by means of a moving ratchet 3 causes to move the other 1' of the plates connected by the chain 2 to the plate 1 until the moving ratchet 3 is stopped by an abutment thereof against a filter plate to the side of the movable head 19. At that moment, an overload detecting device 28 provided in a driving device 27 makes stop a motor 21 for driving the moving ratchet 3. Under the opened condition, the filter cakes are discharged or removed from the opened filter chambers on both sides of the filter plate 1'. The filter plate 1' is in intermediate position. Then the motor 21 for driving the moving ratchet 3 rotates inversely to drive the moving ratchet 3 in the reverse direction until the moving ratchet 3 is stopped by an abutment against a filter plate to the side of the front head frame 26. At the moment the overload detecting device 28 stops the motor 21 in the same manner as described above. By repeating these operations the plurality of filter plates are partially opened in succession. Such shifters for filter plates have been known.

The shifters constructed as above described are substantially effective for filter presses having only a small number of filter plates. With filter plates having an increased number of filter plates, however, opening distances $l_0$ and $l_1$ between the filter plate 1' and the filter plates adjacent thereto on both sides thereof are varied. In other words, the distance $l_0$ is substantially constant determined by the constant length of the chain 2, but the distance $l_1$ is markedly different at the initial and last stages of the opening owing to the elastic restoration of packing materials or filter cloths of the already opened filter plates.

Such a variation in opening distance $l_0$ and $l_1$ of the filter plates may obstruct the discharge of filter cakes by vibrating filter cloths 23 by means of rotating vibrating devices 22 and the filter cloth washing operation by insertion of a washing device 24 between the filter cloths 23. To overcome this problem in known construction it has also been suggested to connect all the filter plates by chains of a constant length and to pull every other filter plates in an opening direction by means of a moving ratchet, such that the other filter plate than a filter plate in intermediate position is shifted or opened to an excess extent in consideration of the elastic restoration of the packing materials and filter cloths. With this construction the movement of the filter plates by the traction of the moving ratchet causes to move the next adjacent filter plate and further next filter plate by means of the chains.

Accordingly, when the moving ratchet moves in the reverse direction in the preparation for opening the next filter plates, the movement of the ratchet causes to return in the reverse direction the filter plate at the tail end, which is slightly opened, until the tail end filter plate strikes a closed filter plate of front head frame side to energize the overload detector because the moving ratchet never stops until it strikes the closed filter plate, with the result that the other filter plates which have already been opened are also returned by the chains. Therefore, such returned filter plates will obstruct the discharge of filter cakes and particularly the filter cloth washing by the insertion of cleaning nozzles between the filter plates.

Figure 2:
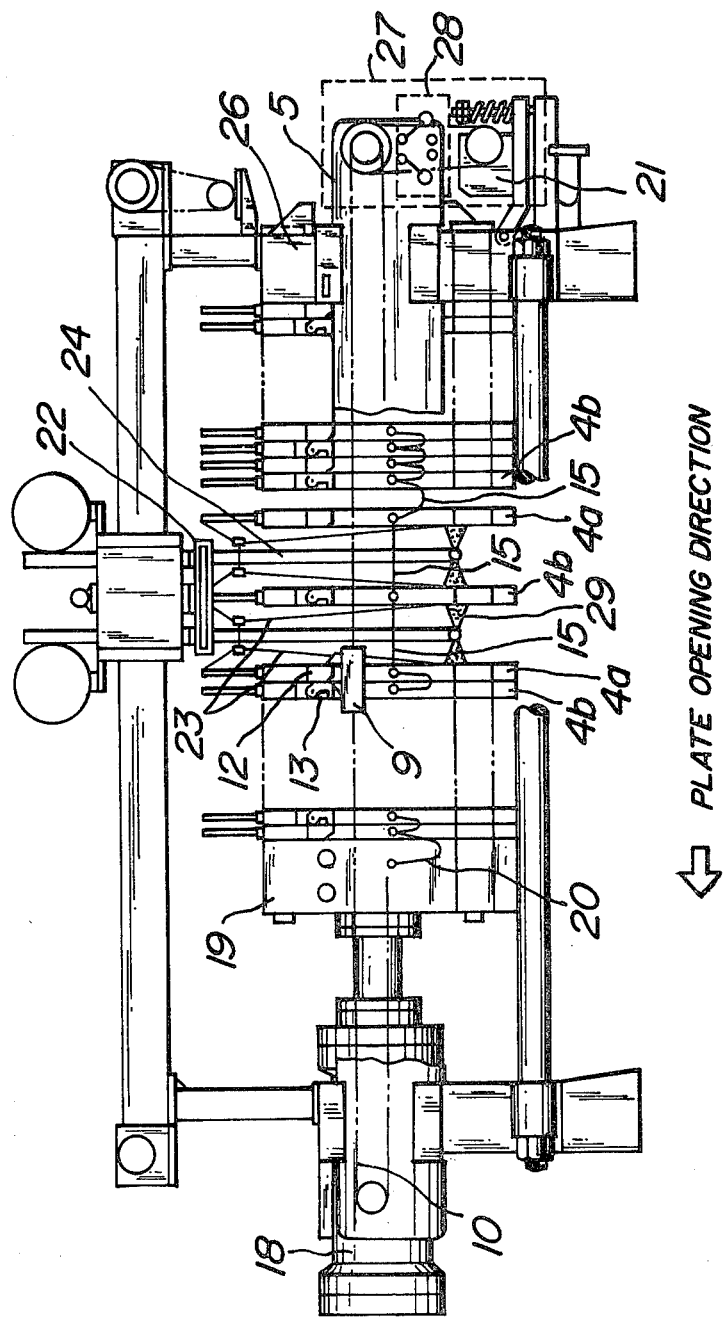
FIG. 2 is an explanatory diagrammatical front elevation of a filter press employing the filter plate opening mechanism according to the present invention.
Figure 3:
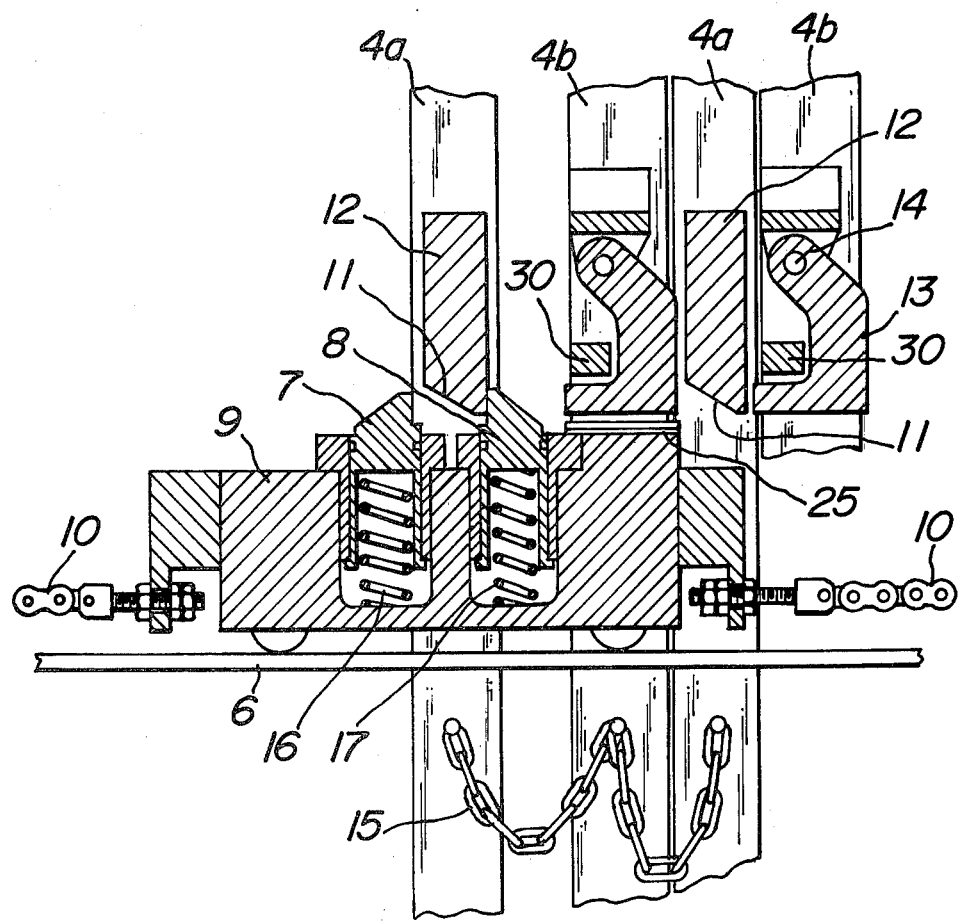
FIG. 3 is an explanatory sectional view showing the main part of the filter plate opening mechanism according to the present invention.
Figure 4:
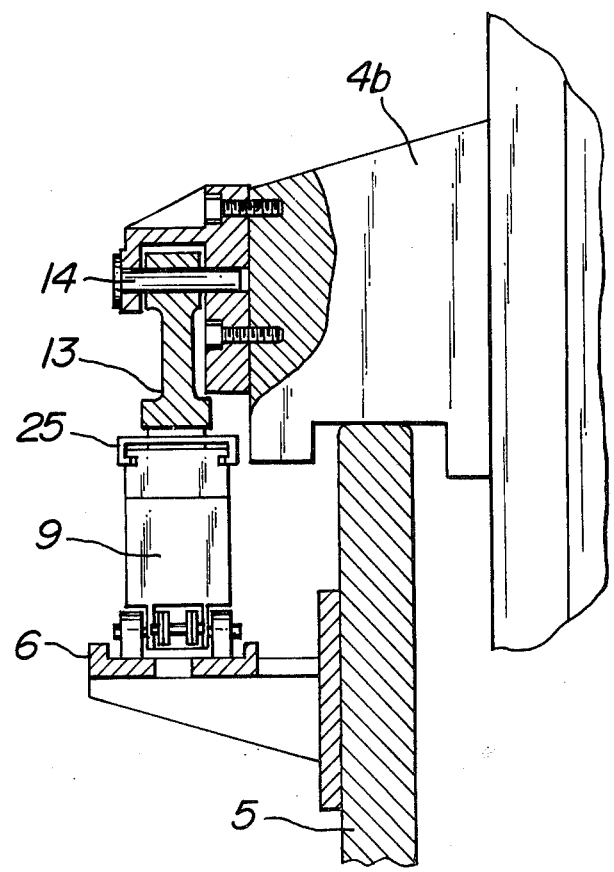
FIG. 4 is an explanatory representation showing partially in section, the main part of the mechanism according to the present invention.

Referring to FIGS. 2–4 showing one embodiment of the present invention, a plurality of filter plates 4a and 4b are suspendingly supported on a filter plate support frame 5 to which are attached rails 6 in parallel therewith, on each of which is arranged a moving block or carriage 9 having a pair of ratchets 7 and 8. Both ends of the carriage 9 are connected by a chain 10 to form an endless linkage. One 4a of the each two adjacent filter plates is provided at its side surface with a filter plate pulling fitting or latch 12 adapted to engage one 8 of the ratchets of the carriage 9 when the filter plates are opening. The filter plate pulling latch 12 is preferably formed at its lower end with an oblique surface 11 directing in a plate opening direction. The other 4b of the each two adjacent filter plates is provided at its side surface with a pivotal pendulum 13 pivotally attached thereto by means of a pin 14 which pivots upwardly only in a semicircular path because of an obstruction of a stopper 30 provided on the plate opening side. The pivotal pendulum 13 is pivotally moved upwardly in the semicircular path by the ratchets 7 and 8 of the carriage 9 when the carriage 9 is moving in a direction opposite to the plate opening direction under a condition of the separated or opened filter plates. If the filter plates are close to each other, the pivotal pendulum 13 abuts against the filter plate pulling latch 12 of the trailing filter plate 4a so as not to pivotally move and then engages the ratchet 7 of the carriage 9, so that the carriage 9 is stopped by the engagement with the pendulum 13. The stopper 30 is provided for the purpose of pulling the filter plate 4b to an opening direction. But since it is not required to do so at normal work, the stopper 30 may be dispensed with. In this manner a plurality of the filter plates 4a having at their side surfaces the filter plate pulling latches 12 and the filter plates 4b having at their side surfaces the pivotal pendulums 13 are alternately vertically supported and the respective adjacent filter plates are connected by means of plate connectors 15 having an equal length. The ratchets 7 and 8 of the carriage 9 can be depressed and restored with the aid of springs 16 and 17 settled in recesses in the carriage 9 and the top surfaces of the ratchets 7 and 8 are preferably oblique facing to the plate opening and opposite directions, respectively. The movement of the carriage 9 in the direction opposite to the opening direction under the condition of the separated filter plates causes the ratchets 8 and 7 to be depressed by their abutment against the filter plate pulling latch 12, and then restored or extended ratchets 8 and 7 by the actions of the springs cause the pivotal pendulum 13 to move upwardly in the direction opposite to the opening direction, so that the carrige 9 passes by the separated filter plates. On the contrary, under the condition of the close filter plates the artchet 7 abuts against the pivotal pendulum 13 not capable of the upward pivotal movement, resulting in the stoppage of the carriage 9. The movement of the carrige 9 in the opening direction causes the ratchet 8 to engage the plate pulling latch 12 to move the filter plate 4a away from the adjacent filter plate 4b and pulling actions of the plate connectors 15 in connection with the movement of the preceding filter plate 4a cause the tailed filter plates 4b and 4a to open partially at substantially determined intervals.

The number of the filter plates to be partially opened may be determined at will. The length of the plate connectors 15 and plate opening strokes should be adjusted such that the last filter plate among the partially opened plates is the plate 4a having the plate pulling latch 12 and spaced apart from the next filter plate 4b at an appropriate distance in consideration of the elastic restoration amounts of the packing materials and filter cloths. The filter plates may of course be ones provided with squeeze mechanisms or the normal ones.

The filter plate partially opening mechanism for filter presses according to the invention is constructed as above described and operates as follows. After completion of dewatering or squeeze of slurry, when the movable head 19 is opened by means of a hydraulic cylinder 18, the filter plate 4a having the plate pulling latch 12 is slightly moved by pulling action of the chain 20 connecting the filter plate with the movable head 19. Thereafter, the motor 21 for driving the carriage 9 is energized to cause it move in the direction opposite to the plate opening direction by the traction of the endless chain 10. The ratchets 8 and 7 of the carriage 9 successively abuts against the plate pulling latch 12 of the filter plate 4a to be depressed, so that the carriage 9 passes by the filter plate 4a and then the ratchets 7 and 8 are restored to their respective extended positions by means of the forces of the springs 16 and 17. Then the ratchet 8 of the carriage 9 abuts against the pivotal pendulum 13 of the adjacent filter plate 4b. However, the pivotal pendulum 13 does not pivotally move by the obstruction of the plate pulling latch 12 of the following filter plate 4a, so that the ratchet 8 is depressed by the abutment against the pivotal pendulum 13 and moving under this depressed condition. The ratchet 7 then abuts against the pivotal pendulum 13 but is not depressed because of their flat surfaces at the abutment, resulting into a stoppage of the carrige 9. An overload detector 28 provided on a driving device 27 detects the stoppage of the carriage 9, at the moment of which the motor 21 stops and rotates in the reverse rotating direction. With the result that the carriage 9 starts to move in the filter plate opening direction and then the ratchet 7 is depressed by the abutment against the filter plate pulling latch 12, so that the carriage 9 passes by the latch 12 until the ratchet 8 abuts against the filter plate pulling latch 12. The abutment of the ratchet against the latch with their flat surfaces causes the filter plate 4a to move towards the movable head 19. The adjacent filter plate 4b and further following filter plate 4a are subsequently opened or shifted.

As above described, the number of the filter plates opened by one opening operation, the length of the space holding means and an opening stroke of the movable head are adjusted such that the last filter plate among the filter plates opened by one opening operation is the filter plate 4a having the filter plate pulling latch 12. When the distances from the filter plate 4b to the filter plates 4a on both sides become substantially equal, the discharge of filter cakes may be effected by vibrating the filter cloths 23 by means of a filter cloth vibrating means 22 or the washing of the filter cloths 23 is effected by sprays 29 from filter cloth washing devices 24 inserted between the filter plates. During the discharge of the filter cakes or washing of the filter cloths, the carriage 9 moves in the direction opposite to the filter plate opening direction in preparation for the next opening or shifting the filter plates and passes by the filter plate 4a because the ratchets 8 and 7 are depressed by the filter plate pulling latch 12 of the filter plate 4a. When the ratchets 8 and 7 abut in succession against the pivotal pendulum 13 of the filter plate 4b during the discharge of the filter cakes and the washing of the filter cloths under the condition of separated filter plates, the pivotal pendulum 13 is caused to pivotally move upwardly in the semicircular path in the direction opposite to the plate opening direction so that the carriage 9 passes by the filter plate 4b and the next filter plate 4a having a plate pulling latch 12 in the same manner. Thereafter the ratchet 7 abuts against the pivotal pendulum 13 of the filter plate 4b close to the following filter plate to stop the carriage 9. By repeating the above operation, a plurality fo the filter plates are successively opened and all the filter plates are opened or shifted.

After all the filter plates have been opened, it is required to return the carriage 9 to its initial position on the side of the movable head 19. To this end, a cover 25 is provided on the carriage 9 as shown in FIGS. 3 and 4 and the carriage 9 is fed to the front head frame 26 to automatically depress the ratchet 8 by means of the cover 25. The cover 25 keeps the ratchet 8 depressed, so that the carriage 9 is possible to pass by the filter plates towards the movable head 19.

It can be seen from the above description, the filter plate opening mechanism for filter presses is simple in construction and capable of securely opening a plurality of filter plates at a determined interval, so that the discharge of filter cakes and washing of filter cloths are carried out with ease without any trouble. The mechanism can be simply installed in any kinds of existing filter presses, so that it is very useful for industrial purposes.

While preferred embodiments have been described, variations thereto will occur to those skilled in the art within the scope of the present inventive concepts which are delineated by the following claims.

What is claimed is:

1. A filter plate opening mechanism for successively opening partial filter plates of a filter press, which filter plates are vertically supported on a filter plate support frame, comprising filter plate pulling latches arranged on side surfaces of every other filter plate, pivotal pendulums arranged on side surfaces of remaining filter plates, plate connectors substantially the same in length connecting all the filter plates, and a pair of carriages arranged on rails parallel to said filter plate support frame provided on both sides of said filter plates, each carriage being driven by a chain whose ends are connected to said carriage to form an endless linkage therewith and having a pair of ratchets in opposition to each other capable of depressing and restoring with the aid of springs, whereby when said carriage moves in a filter plate opening direction, one of said pair of ratchets engages the filter plate pulling latch of one of the filter plates to shift the filter plate in the opening direction and the movement of the engaged filter plate causes to shift successively in the same direction at least two other filter plates connected thereto by said plate connector, and when said carriage moves through separated filter plates in a direction opposite to said opening direction, said pair of ratchets are depressed by their abutments against said filter plate pulling latch and said pivotal pendulums are upwardly pivotally moved by abutments of said pair of ratchets thereagaint, thereby enabling said carriage to pass by the separated filter plates in the direction opposite to said opening direction and when said carriage approaches the close filter plates in the direction opposite to said opening direction, the other of said pair of ratchets engages the pivotal pendulum restrained by the adjacent filter plate pulling latch resulting in the stopping of said carriage which thereafter moves in the opening direction.

2. A mechanism as set forth in claim 1, wherein each said filter plate pulling latch is formed at its lower end with an oblique surface directed in the plate opening direction and the pair of ratchets are formed at their upper ends with oblique surfaces directed in the plate opening direction and the opposite direction thereto respectively.

3. A mechanism as set forth in claim 1, wherein said plate connectors are chains.

4. A mechanism as set forth in claim 1, wherein each said pivotal pendulum is able to move pivotally upwardly in the direction opposite to the plate opening direction but is restrained from moving in the plate opening direction by a stopper.

* * * * *